United States Patent [19]

Yamaguchi

[11] 4,194,607

[45] Mar. 25, 1980

[54] ELECTRO-MAGNETIC SPRING-WOUND CLUTCH

[75] Inventor: Toshio Yamaguchi, Matsuyama, Japan

[73] Assignee: Diesel Kiki Company, Ltd., Tokyo, Japan

[21] Appl. No.: 866,645

[22] Filed: Jan. 3, 1978

[30] Foreign Application Priority Data

Jan. 14, 1977 [JP] Japan .............................. 52-2553[U]
Mar. 1, 1977 [JP] Japan ............................ 52-23302[U]

[51] Int. Cl.² ...................... F16D 13/08; F16D 27/10
[52] U.S. Cl. ..................................... 192/84 T; 192/35
[58] Field of Search .................... 192/35, 36, 84 T

[56] References Cited

U.S. PATENT DOCUMENTS

| | | | |
|---|---|---|---|
| 3,808,895 | 5/1974 | Fitzwater | 192/84 T X |
| 3,865,222 | 2/1975 | Briar | 192/84 T X |
| 4,030,584 | 6/1977 | Lowery et al. | 192/84 T |

Primary Examiner—Allan D. Herrmann
Attorney, Agent, or Firm—David G. Alexander

[57] ABSTRACT

Input and output members and a clutch disc are coaxially rotatable relative to each other, the clutch disc being frictionally engageable with the input member. A coil-wound spring is wound around the input member and connected at its ends to the clutch disc and output member. An electromagnetic coil may be energized to attract the clutch disc into frictional engagement with the input member, causing the coil-wound spring to tightly wind around the input member and drivably connect the input member to the output member. A spring means quickly and smoothly disengages the clutch disc from the input member when the coil is de-energized. A plurality of pins extending through the output member and the clutch disc ensure parallel movement of the clutch disc toward and away from the input member.

10 Claims, 14 Drawing Figures

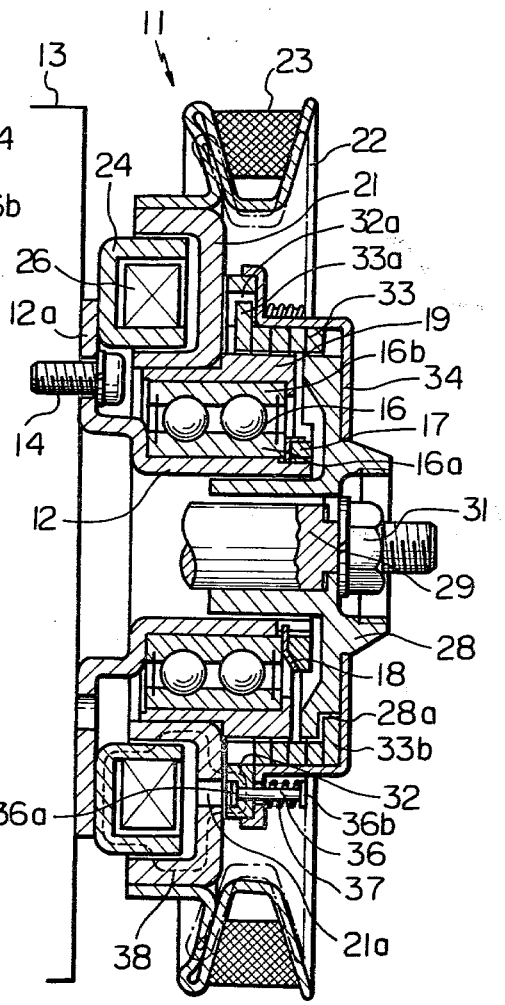
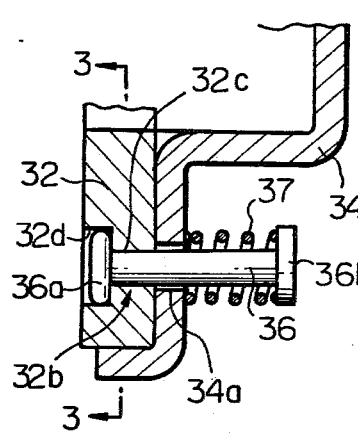
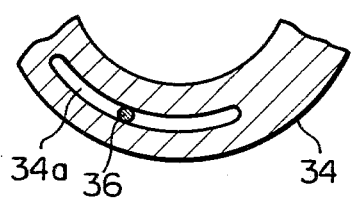
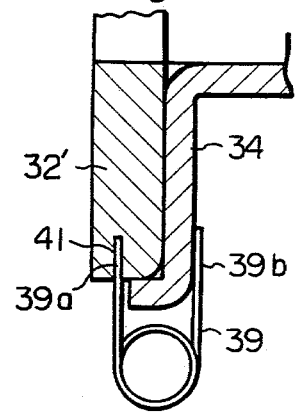

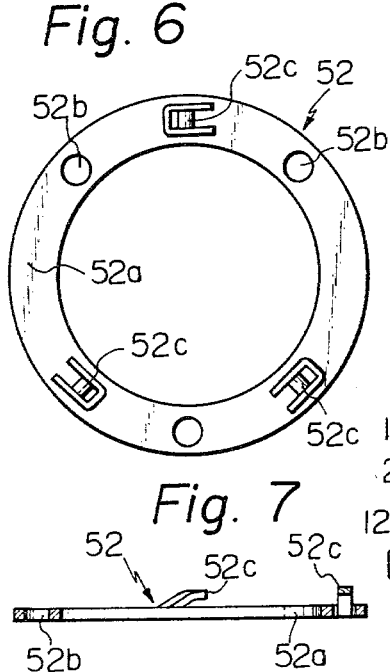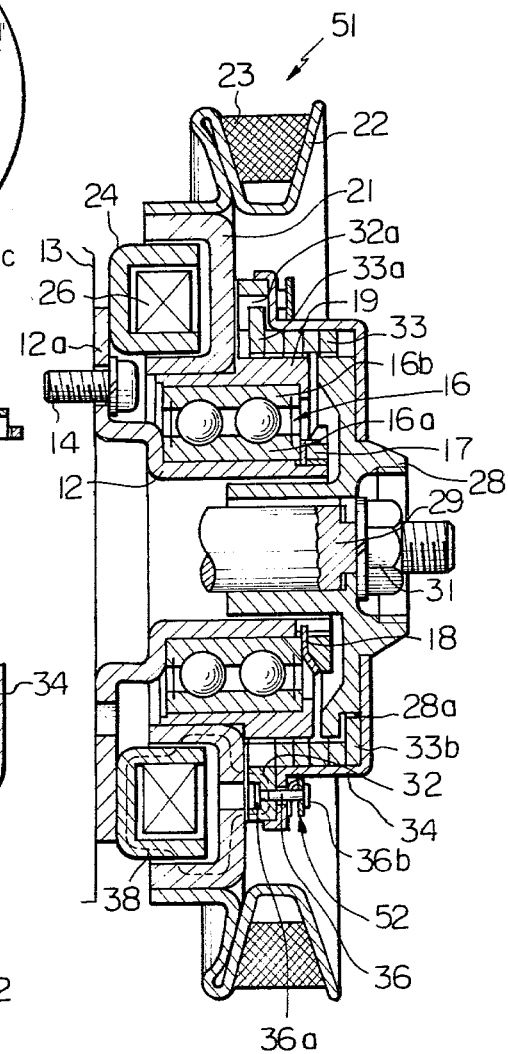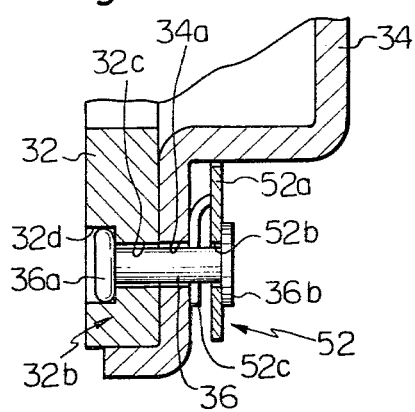

ELECTRO-MAGNETIC SPRING-WOUND CLUTCH

BACKGROUND OF THE INVENTION

The present invention relates to an improved electromagnetic spring-wound clutch which may be advantageously employed to connect an air conditioning compressor to an engine of an automotive vehicle.

An electromagnetic spring-wound clutch of the general type to which the present invention relates is disclosed in U.S. Pat. No. 3,735,847 and comprises coaxial input and output members. A clutch disc is rotatably provided on the input member. Furthermore, a coil-wound spring is wound around the input member and connected at its opposite ends to the clutch disc and output member. An electromagnetic coil attracts the clutch disc into frictional engagement with the input member, causing the coil-wound spring to be tightly wound the input member and drivably connect the input member to the output member. When the coil is de-energized, the clutch disc disengages from the input member, and the coil-wound spring releases the input member for rotation relative to the output member.

A major problem in this type of clutch is obtaining fast and smooth disengagement of the clutch plate. More specifically, the clutch plate tends to vibrate during disengagement, causing noise, and furthermore does not disengage completely parallel to the input member. In extreme cases, the clutch plate may be deformed or even break. A prior art attempt to overcome this problem involves an arrangement in which the coil-wound spring is stretched axially by the clutch plate when the coil is energized, and disengages the clutch plate when the coil is de-energized due to its resilience. However, due to the large spring constant required to drivably connect the input member to the output member, the coil must have an excessive magnetomotive force to stretch the coil-wound spring. Such a large coil cannot be fit into the clutch in a practical manner.

SUMMARY OF THE INVENTION

The present invention overcomes the above described drawbacks of the prior art by providing an electromagnetic spring-wound clutch comprising spring means and an arrangement of pins to quickly disengage a clutch plate from an input member and maintain the clutch plate parallel to the input member.

It is an object of the present invention to provide an electromagnetic spring-wound clutch which disengages quickly and smoothly.

It is another object of the present invention to eliminate a major cause of vibration and noise in an electromagnetic spring-wound clutch.

It is another object of the present invention to eliminate a major cause of damage in an electromagnetic spring-wound clutch.

It is another object of the present invention to provide a generally improved electromagnetic spring-wound clutch.

Other objects, together with the foregoing, are attained in the embodiments described in the following description and illustrated in the accompanying drawing.

BRIEF DESCRIPTION OF THE DRAWING

FIG. 1 is a sectional elevational view of a first embodiment of an electromagnetic spring-wound clutch of the present invention;

FIG. 2 is a fragmentary sectional elevation illustrating an important feature of the embodiment of FIG. 1;

FIG. 3 is a section on a line 3—3 of FIG. 2;

FIG. 4 is similar to FIG. 2 but illustrates a modification thereof;

FIG. 5 is similar to FIG. 1 but shows a second embodiment of the invention;

FIG. 6 is a plan view of an annular spring of the embodiment of FIG. 5;

FIG. 7 is a sectional view of the spring of FIG. 6;

FIG. 8 is a fragmentary sectional elevation illustrating an important feature of the embodiment of FIG. 5;

DESCRIPTION OF THE PREFERRED EMBODIMENTS

Figure 9:
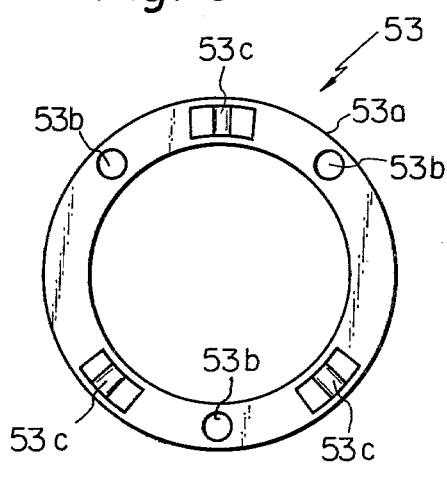
FIG. 9 is a plan view of another annular spring of the invention.

While the electromagnetic spring-wound clutch of the invention is susceptible of numerous physical embodiments, depending upon the environment and requirements of use, substantial numbers of the herein shown and described embodiments have been made, tested and used, and all have performed in an eminently satisfactory manner.

Referring now to FIG. 1 of the drawing, an electromagnetic spring-wound clutch embodying the present invention is generally designated as 11 and comprises a tubular hub 12 which is rigidly mounted to a compressor 13 of an air conditioning system for an automotive vehicle (not shown) by means of a flange 12a of the hub 12 and bolts 14. An inner race 16a of a ball bearing 16 is fitted over the hub 12 and is rigidly held in place by means of a nut 17 screwed onto a threaded right end portion of the hub 12 and an intervening lock washer 18. A tubular input member 19 is tightly fit onto an outer race 16b of the bearing 16 and rigidly held in place by means of a reduced diameter right shoulder and a left end of the input member 19, the latter being crimped over the left end of the outer race 16b. An annular member 21 having a hollow cross-section is press fitted onto the input member 19. The left wall of the annular member 21 is cut away, and a plurality of circumferentially spaced, arcuate slots 21a are formed through the right wall of the annular member 21, although only one slot 21a is visible in the drawing. A pulley 22 is press fitted onto the annular member 21 and connected to an engine of the automotive vehicle (not shown) through a V-belt 23.

Another annular member 24 is welded to the flange 12a of the hub 12 and fits inside the hollow of the annular member 21 without touching the same. The right wall of the annular member 24 is cut away. Rigidly mounted inside the annular member 24 is an electromagnetic coil 26 which may be energized through leads which are not shown.

A generally tubular output member 28 is rotatably supported inside the hub 12. An output shaft 29 is threaded at its right end and rigidly fixed to the output member 28 by means of a nut 31 and conjugate shoulders of the shaft 29 and output member 28. The output shaft 29 is constituted by a drive shaft of the compressor 13, although the connection is not shown in detail.

An annular clutch disc 32 is rotatably provided around the input member 19. A coil-wound spring 33 is wound around the input member 19 in such a manner as to loosely engage the input member 19 in its free state. One end of the spring 33 is connected to the clutch disc 32 by means of a radially outwardly extending tab 33a of the spring 33 which fits in a slot 32a formed in the inner circumference of the clutch disc 32. The other end of the spring 33 is connected to the output member 28 by means of a radially inwardly extending tab 33b of the spring 33 which fits in a slot 28a formed in the outer circumference of the output member 28. The clutch 11 further comprises a cover 34 which is welded or otherwise firmly attached to the output member 28. The cover 34 encloses the coil-wound spring 33 and extends adjacent to the clutch disc 32.

As best seen in FIGS. 2 and 3, a plurality (3 or more) of arcuate slots 34a are formed through the outer portion of the cover 34 which faces the clutch disc 32, although only one slot 34a is visible in the drawing. A pin 36 having left and right heads 36a and 36b respectively slidably extends through each slot 34a, the diameter of the pin 36 being substantially the same as that of the slot 34a. Conjugate to the slots 34a, circumferential spaced holes 32b are formed through the clutch disc 32. Each hole 32b comprises a small portion 32c having a width equal to the diameter of the pin 36 and a large portion 32d having a width greater than a diameter of the left head 36a of the pin 36. A compression spring 37 is provided in preloaded form around each respective pin 36, between the cover 34 and the right head 36b. The springs 37 urge the pins 36 and thereby the clutch disc 32 rightwardly so that the clutch disc 32 abuts against the cover 34. In this state, the clutch disc 32 is spaced from the annular member 21. The clutch disc 32 is supported by the pins 36 and guided thereby for axial movement in parallelism with the annular member 21.

The input member 19, annular member 21 and pulley 22 are mutually coaxial and are driven by the V-belt 23 in an integral manner. The output member 28, output shaft 29 and cover 34 are also mutually coaxial and rotate as a unit.

With the coil 26 de-energized, the springs 37 urge the clutch disc 32 out of engagement with the annular member 21 and into engagement with the cover 34. The coil-wound spring 33 expands to its free state so as to loosely embrace the input member 19. The annular member 21 rotates relative to the clutch disc 32, which remains stationary. There is no driving connection between the pulley 22 and output shaft 29, and the output shaft 29 remains stationary.

To engage the clutch 11 and drive the compressor 13 from the pulley 22 by means of the output shaft 29, the coil 26 is energized with electric current. A magnetic circuit is established from the coil 26 through the slots 21a of the annular member 21 and the clutch disc 32 indicated by a phantom line curve 38 in FIG. 1. This attracts the clutch disc 32 leftwardly into frictional engagement with the annular member 21 against the force of the springs 37. The clutch disc 32 rotates with the annular member 21, winding the coil-wound spring 33 tightly around the input member 19. Due to the provision of the tabs 33a and 33b and slots 32a and 28a, the output member 28 is drivingly connected to the input member 19 through the clutch disc 32 and spring 33. The pulley 22, output shaft 29 and intervening components rotate as a unit, driving the compressor 13 from the engine. The rotational movement of the clutch disc 32 relative to the cover 34 necessary for winding the coil-wound spring 33 around the input member 19 is made possible by the slots 34a in the cover 34.

To disengage the clutch 11, the coil 26 is de-energized, thereby removing the magnetic attractive force from the clutch disc 32. The springs 37 immediately and smoothly move the clutch disc 32 away from the annular member 21 and into abutting engagement with the cover 34.

It will be noted that the clutch disc 32 is maintained parallel to the annular member 21 by the pins 36, and thereby engages and disengages the annular member 21 in a completely smooth manner. Vibration, noise and damage to the clutch disc 32 are positively prevented by the springs 37 which immediately disengage the clutch disc 32 from the annular member 21 upon de-energization of the coil 26.

Although only one coil-wound spring 33 is shown and illustrated, it will be understood by those skilled in the art that two intertwined coil-wound springs may be provided.

FIG. 4 shows a modification of the clutch 11 in which the compression springs 37 are replaced by torsion springs 39. A left end 39a of each spring 39 is tightly fitted in a groove 41 formed in the circumference of a modified clutch plate 32'. The right end of the spring 39 is designated as 39b and engages the surface of the cover 34 opposite to the clutch plate 32', or the right surface of the cover 34. The springs 39 are designed so that the ends 39a and 39b have a tendency to approach each other and urge the clutch disc 32' into engagement with the cover 34. The end 39b of each spring 39 is free to slide on the cover 34 in circumferential direction to allow relative rotational movement of the clutch disc 32' and cover 34 as the coil-wound spring 33 winds and unwinds from the input member 19. This embodiment is advantageous in that the springs 39 are light in weight and easy to install.

FIG. 5 shows another clutch 51 of the present invention in which like elements are designated by the same reference numerals used in FIGS. 1 to 3. The clutch 51 differs from the clutch 11 in that the springs 37 are replaced by a generally annular spring 52 which is disposed between the cover 34 and the heads 36b of the pins 36. The spring 52 is shown in detail in FIGS. 6 and 7 and comprises an annular plate 52a formed with holes 52b for the pins 36. Circumferentially spaced between adjacent holes 52b are formed tongues or lugs 52c which extend axially from the plate 52a. As best seen in FIG. 8, the plate 52a engages the heads 36b of the pins 36 and the lugs 52c engage the cover 34.

The spring 52 is made of spring steel, and the lugs 52c are therefore resilient. The spring 52 is disposed between the heads 36b of the pins 36 and the cover 34 in a preloaded state in which the lugs 52c are resiliently deformed toward the plate 52a. Thus, the lugs 52c urge the clutch disc 32 through the pins 36 into abutting engagement with the cover 34 when the coil 26 is de-energized. The spring 52 may be fabricated by die-cutting the lugs 52c and bending the same outwardly.

Figure 10:
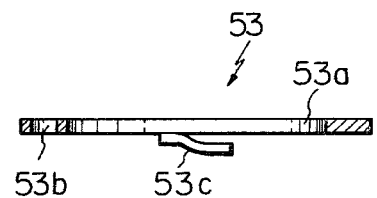
FIG. 10 is a sectional view of the spring of FIG. 9.

FIGS. 9 and 10 show another annular spring 53 which may replace the spring 52. The spring 53 differs in that lugs 52c made of spring steel or another resilient material are welded or otherwise firmly attached to a rigid annular plate 53a. Holes 53b are formed through the plate 53a for the pins 36. The spring 53, although requiring extra fabrication steps, is advantageous in that it provides more parallel disposition of the spring 53 on the pins 36 due to the rigidity of the plate 53a.

Figure 11:
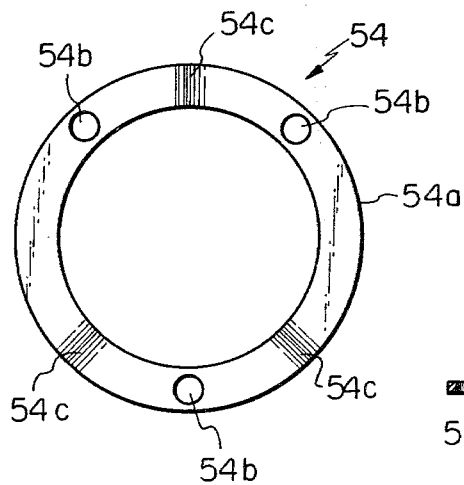
FIG. 11 is a plan view of yet another annular spring of the invention.
Figure 12:
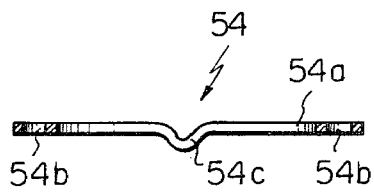
FIG. 12 is a sectional view of the spring of FIG. 11.

FIGS. 11 and 12 illustrate another spring 54 made of spring steel which comprises an annular plate 54a formed with holes 54b for the pins 36. The lugs 52c of the spring 52 are replaced by axial projections 54c which engage the cover 34 in a resiliently deformed manner. The spring 54 is advantageous in that it can be press formed in one operation.

Figure 13:
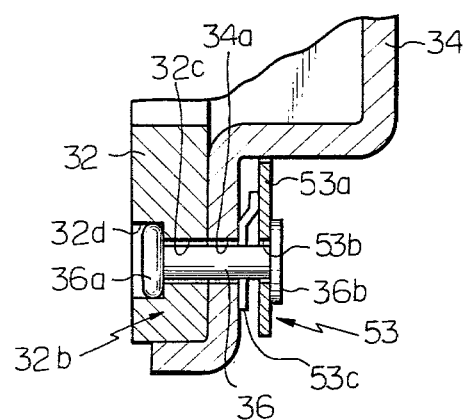
FIG. 13 is a fragmentary sectional elevation illustrating the spring of FIGS. 9 and 10 in combination with the cooperating elements of the clutch.
Figure 14:
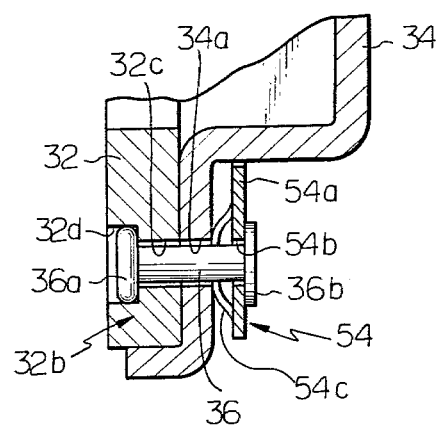
FIG. 14 is a fragmentary sectional elevation illustrating the spring of FIGS. 11 and 12 in combination with the cooperating elements of the clutch.

FIGS. 13 and 14 illustrate the springs 53 and 54 respectively in combination with the cooperating elements of the clutch.

It will be noted that the springs 37, 52, 53 and 54 need to exert only a small force on the clutch disc 32 since it is necessary only to overcome frictional forces of the clutch plate 32 on the pins 36. Where the tabs 33a and 33b of the coil-wound spring 33 are axially slidably retained in the slots 32a and 28a of the clutch disc 32 and output member 28 respectively, the clutch disc 32 may move axially without axial expansion and contraction of the spring 33. Thus, the coil 26 does not have to exert a large force on the clutch disc 32, and may be of a small size suitable for the overall configuration of the clutch 11.

In summary, it will be seen that the present invention overcomes the problems of the prior art and provides an electromagnetic coil-wound clutch which is completely free from vibration, noise and damage upon disengagement thereof. Various modifications will become possible for those skilled in the art after receiving the teachings of the present disclosure without departing from the scope thereof. For example, the clutch disc may be formed with arcuate slots and the cover formed with conjugate round holes in a manner opposite to that illustrated. Another typical modification would be to replace the apring 52 with a suitably formed wave or belleville spring, although not illustrated.

What is claimed is:

1. An electromagnetic spring-wound clutch comprising:
    a rotary input member;
    a rotary output member coaxial with the input member;
    a rotary clutch disc coaxial with the input member and frictionally engageable therewith;
    a coil-wound spring wound around the input member and being connected at its ends to the clutch disc and output member respectively;
    spring means urging the clutch disc to disengage from the input member; and
    an electromagnetic coil which, when energized, attracts the clutch disc into frictional engagement with the input member against a force of the spring means.

2. A clutch as in claim 1, further comprising a cover member fixed to the output member and covering the coil-wound spring, the spring means being disposed to the clutch disc and the cover member.

3. A clutch as in claim 2, in which the cover member is formed with arcuate slots and the clutch disc is formed with circumferentially spaced holes conjugate to the slots, the clutch further comprising double-headed pins extending through the slots and holes respectively.

4. A clutch as in claim 3, in which the spring means comprises compression springs disposed between the cover member and heads of the pins which extend external of the cover member respectively.

5. A clutch as in claim 2, in which the spring means comprises a plurality of torsion springs fixed to the clutch disc and engaging a surface of the cover member opposite to the clutch disc.

6. A clutch as in claim 3, in which the spring means comprises an annular plate disposed between the cover member and heads of the pins which extend external of the cover member and resilient tabs extending axially from the plate and engaging the cover member.

7. A clutch as in claim 6, in which the plate is formed of a resilient material, the tabs being integral with the plate.

8. A clutch as in claim 6, in which the plate is formed of a rigid material, the tabs being attached to the plate.

9. A clutch as in claim 6, in which the tabs are circumferentially spaced between adjacent pins respectively.

10. A clutch as in claim 3, in which the spring means comprises a resilient annular plate disposed between the cover member and heads of the pins which extend external of the cover member, the plate being formed with axial projections engaging the cover member.

* * * * *